(No Model.) 2 Sheets—Sheet 2.
G. STRINGER.
THRASHING MACHINE.
No. 266,399. Patented Oct. 24, 1882.
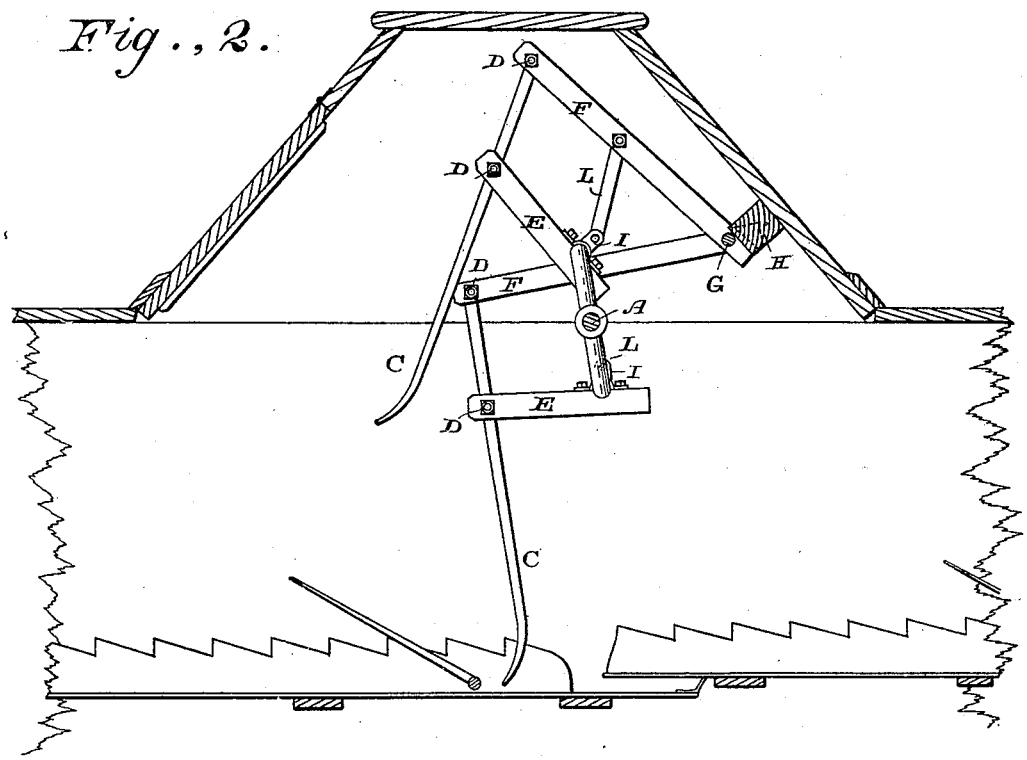
Fig., 2.
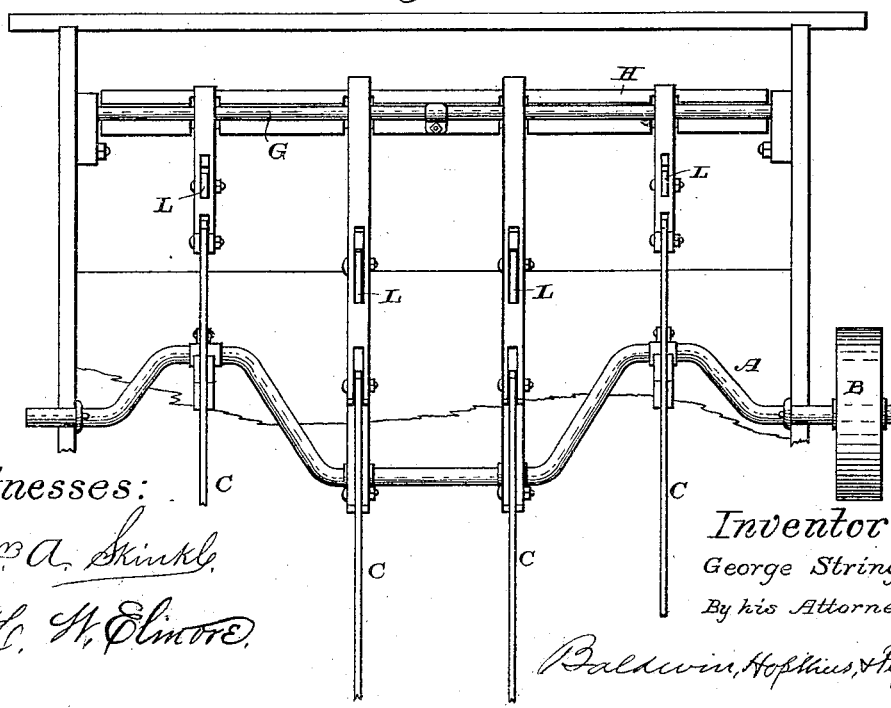
Fig., 3.
Witnesses:
Wm. A. Skinkle
H. W. Elmore
Inventor:
George Stringer.
By his Attorneys
Baldwin, Hopkins, & Peyton

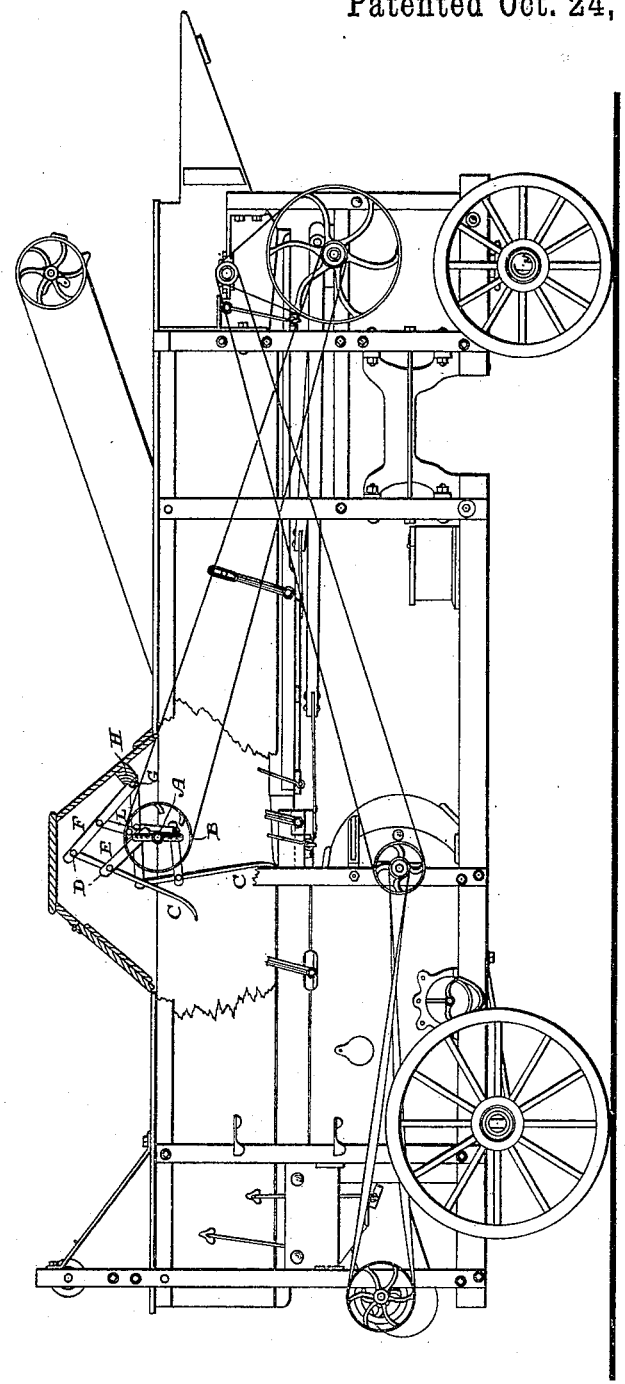

United States Patent Office.

GEORGE STRINGER, OF AUBURN, NEW YORK, ASSIGNOR TO THE E. M. BIRDSALL COMPANY, OF SAME PLACE.

THRASHING-MACHINE.

SPECIFICATION forming part of Letters Patent No. 266,399, dated October 24, 1882.

Application filed September 4, 1882. (No model.)

*To all whom it may concern:*

Be it known that I, GEORGE STRINGER, of Auburn, in the county of Cayuga and State of New York, have invented certain new and useful Improvements in Thrashing-Machines, of which the following is a specification, reference being had to the accompanying drawings.

The object of my invention is to provide an improved straw-picker to be located over the shaker and pick up and loosen the straw as it passes on its way out of the machine.

In the accompanying drawings, illustrating my invention, Figure 1 is a side elevation, partly in section, of so much of a thrashing-machine as is necessary to illustrate my improvements. Fig. 2 is a side elevation of my improvements detached, and drawn on an enlarged scale. Fig. 3 is a plan view of my improvements detached.

A indicates a crank-shaft with its bearings in opposite sides of the frame of the machine. This shaft is driven in the usual manner by a belt-pulley, B, and its angles or bends are preferably as illustrated in Fig. 3, adapting it to operate several tines or fingers, C. Each tine is secured by means of pivots D to two arms, E and F, the former being pivoted to the crank-shaft, and the latter being pivoted to a rod, G, secured to the opposite sides of the frame of the machine.

H indicates a stay-bar, notched to accommodate the oscillations of the arms F and to prevent their sliding out of place laterally, and also serving to strengthen the rod G. Each arm E and F is connected by a link, L, pivoted to the arm F, and to a lug, I, upon the arm E, which lug serves to form the pivotal connection of the arm E and crank-shaft.

The circular sweep of the cranks can be made whatever may be desired in diameter, and the lengths of the arms and links, and the points of pivotal connection of the arms with the tines, and the location of the rod G, may be varied at will by the constructer, so as to give such a throw and motion to the tines as may be desired. My invention, however, always secures two very desirable objects: First, it affords a very strong, reliable, and economical means of holding and working the tines, and, second, it assures to the tines two motions combined, which are precisely what are best adapted to loosen the straw on its way out of the machine and enable all of the grain to be thoroughly separated—to wit, a vertical reciprocating motion in the arc of a circle and an oscillating motion forward and back, so as to pitch the straw upward and forward, thereby leaving it open and free for the grain to separate in its passage.

Having thus described my invention, what I claim as new, and desire to secure by Letters Patent, is—

1. The combination, with a crank-shaft, of the arms E and F, the link L, the rod G, and the tine C, pivotally connected, substantially as set forth.

2. The combination, with a crank-shaft, of the arms E and F, the link L, the lug I, the rod G, and the tine C, pivotally connected, substantially as set forth.

3. The combination, with a crank-shaft, of the arms E and F, the link L, the lug I, the rod G, the tine C, all pivotally connected, and the stay-bar H, substantially as set forth.

In testimony whereof I have hereunto subscribed my name this 30th day of August, A. D. 1882.

GEORGE STRINGER.

Witnesses:
E. B. MOSHER,
WM. A. CRONK.